S. TOWNSEND.
BANDS OR CORDS FOR DRIVING MACHINERY, &c.
No. 190,455. Patented May 8, 1877.
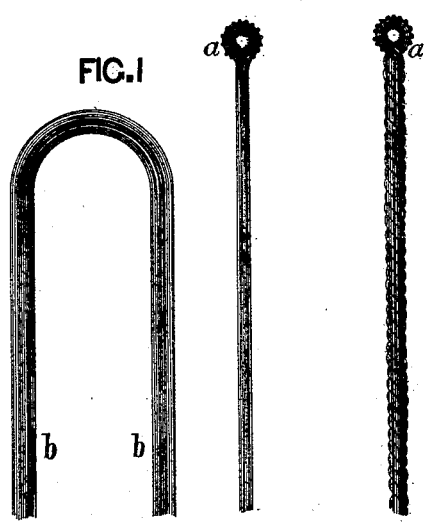
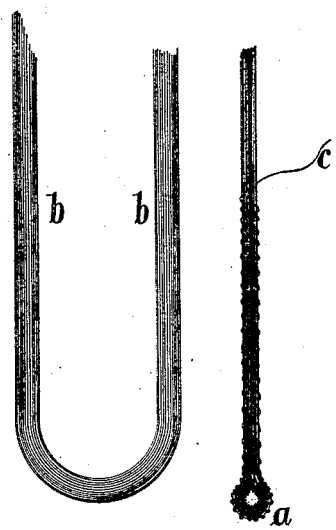
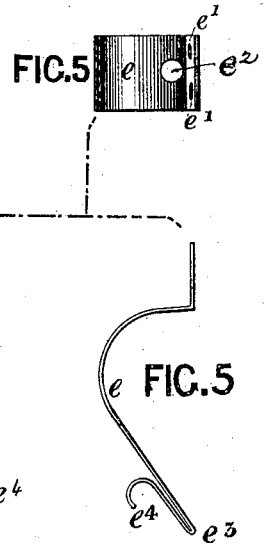
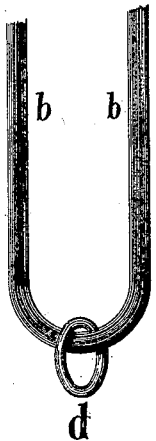
Witnesses
Penn H Halsted
H. H. Doty
Inventor
Samuel Townsend
by John J. Halsted
his Atty.

UNITED STATES PATENT OFFICE.

SAMUEL TOWNSEND, OF EAST DULWICH, ENGLAND.

IMPROVEMENT IN BANDS OR CORDS FOR DRIVING MACHINERY, &c.

Specification forming part of Letters Patent No. 190,455, dated May 8, 1877; application filed February 17, 1877.

*To all whom it may concern:*

Be it known that I, SAMUEL TOWNSEND, of East Dulwich, in the county of Surrey, England, have invented an Improved Band or Cord for Use in Driving Machinery, Supporting Pictures and other objects, and for other uses and parts connected thereto, which improvement is fully set forth in the following specification, reference being had to the accompanying drawing.

The object of the invention is with simplicity to form cords or bands of various lengths, capable of being readily united at the ends thereof, so as to form an endless cord or band, or a cord or band with closed ends.

For this purpose the woolen or other material is, in the yarn or thread, wound into hanks or skeins, as represented by Figure 1. These hanks or skeins, when extended, will be of or about the length desired, and they are then folded together, so as to form two looped ends, as represented by Fig. 2, $a$ $a$ being the looped ends. The intermediate parts or lengths $b$ $b$ may, if desired, be twisted, one part on the other; but in such cases I bind the parts of the hank or skein together by another cord or thread, as represented by the line $c$, leaving the looped ends $a$ $a$ for connection. The effect of the relation of these twistings will be to vary the length of the finished cord or band.

I also bind round the parts of these looped ends, as represented by the cross-lines thereon, and when the cord or band so formed is to be used as an endless cord, then the two looped ends may be connected together by wire or other looping.

I also, in some cases, take two of such skeins or hanks, Fig. 1, and having folded each one side or half hank or skein with the other half hank or skein, I proceed to twist this skein, and in like manner I twist the second skein. I then put these two twisted, folded skeins together, and further twist or combine them into one cord or band, as represented by Fig. 3; and in order to prevent their untwisting the one from the other, I bind around their joint ends or combined loops another thread or threads, or wire, at each end of the band.

These ends of each band may then be united, to form an endless or continuous band, by a wire or other looping or connecting means, as already stated.

When these bands or cords are to be employed for suspending pictures or other objects, I, during the process of winding the two skeins or hanks, pass the threads forming each skein or hank through a ring, $d$, at each turn in winding, as represented by Fig. 4; or it may be a ring with a screw-stem thereon, and the two hanks being separately twisted, brought together, and twisted further into one band, it will only be requisite to bind the loops of the two bands together at their ends opposite to those held together by this ring; or both may be so bound, if desired; and I place thereon another ring of the kind known as "split rings," or other ring, or ring and screw-stem combined, so divided as to be capable of being placed thereon. Or, instead of only two skeins or hanks being thus treated, several such skeins may be so combined into one band or cord, and at their loop ends joined by binding, and have placed through one or each of the loops so formed a ring or loop, or ring with screw-stem attached, of metal or other suitable material, or other connection.

The respective hanks or skeins of this band or cord may be composed of thread of different colors or shades, by which, in the completed cord, a pleasing effect may be obtained.

In applying the cords or bands to picture-frames, I pass one end of the finished band or cord through the ring ordinarily screwed into one side of such frame; then through its own ring $d$; then through a hole, $e^2$, formed in a bent spring, $e$, (shown by Fig. 5,) formed by curving or arching, so that upon its one end, $e^1$, being screwed to the back of the frame, the part of the cord may pass through the hole $e^2$ therein, above mentioned, and then under the other end, $e^3$, of the arched spring $e$, which then presses this cord between it and the frame, and thereby retains the cord by the nip effected. This holding at $e^3$ may be aided by a groove in the frame, when needed.

To lengthen or shorten the cord, the spring $e$ is raised slightly at $e^3$ from the cord by means of the part $e^4$ thereof being formed as a handle for that purpose, or by raising the spring itself directly.

What I claim is—

The improved band or cord formed by means of endless skeins, twisted one part on the other, or two or more skeins on each other, leaving an eye or loop at the end or ends, and held by other binding cord or cords, in manner and for the purpose stated.

In testimony whereof I have signed my name to this specification in the presence of two subscribing witnesses.

SAMUEL TOWNSEND.

Witnesses:
   WILLIAM BROOKES,
   ALFRED GEORGE BROOKES.